United States Patent [19]

Komuro

[11] Patent Number: 4,549,629
[45] Date of Patent: Oct. 29, 1985

[54] REAR SEAT DEVICE FOR TWO-WHEELED MOTOR VEHICLES

[75] Inventor: Katsusuke Komuro, Tokyo, Japan

[73] Assignee: Honda Giken Kogyo Kabushiki Kaisha, Tokyo, Japan

[21] Appl. No.: 515,567

[22] Filed: Jul. 20, 1983

[30] Foreign Application Priority Data

Jul. 20, 1982 [JP] Japan ............................... 57-126099

[51] Int. Cl.⁴ ........................ B62D 61/02; A47C 7/54
[52] U.S. Cl. ................................. 180/219; 280/289 A;
  280/289 E; 280/290; 297/417; 297/DIG. 9
[58] Field of Search ................... 180/219; 280/289 A,
  280/289 E, 290; 297/195, 417, 162, 155, 243,
  DIG. 9

[56] References Cited

U.S. PATENT DOCUMENTS

| | | | |
|---|---|---|---|
| 3,425,745 | 2/1969 | Michels | 297/195 |
| 3,853,351 | 12/1974 | Lassiter | 297/195 X |
| 3,913,974 | 10/1975 | Bowen | 297/195 |
| 3,993,350 | 11/1976 | McFarlane | 297/417 |
| 4,030,750 | 6/1977 | Abram | 280/289 E X |
| 4,111,448 | 9/1978 | Sklodowsky | 280/289 E |
| 4,163,513 | 8/1979 | Kramer | 280/289 A X |
| 4,216,994 | 8/1980 | Benoit | 297/162 |
| 4,225,183 | 9/1980 | Hanagan et al. | 297/195 X |
| 4,413,699 | 11/1983 | Omholt | 180/219 |
| 4,447,088 | 5/1984 | Bodlovic | 280/289 A X |

Primary Examiner—Joseph F. Peters, Jr.
Assistant Examiner—Charles R. Watts
Attorney, Agent, or Firm—Armstrong, Nikaido, Marmelstein & Kubovcik

[57] ABSTRACT

A rear seat device for a two-wheeled motor vehicle having front and rear seats mounted on a frame. This rear seat device includes a back rest portion supported by the frame behind the rear seat and a foldable arm rest attached to the back rest portion. The rear passenger can enjoy a comfortable ride.

17 Claims, 17 Drawing Figures

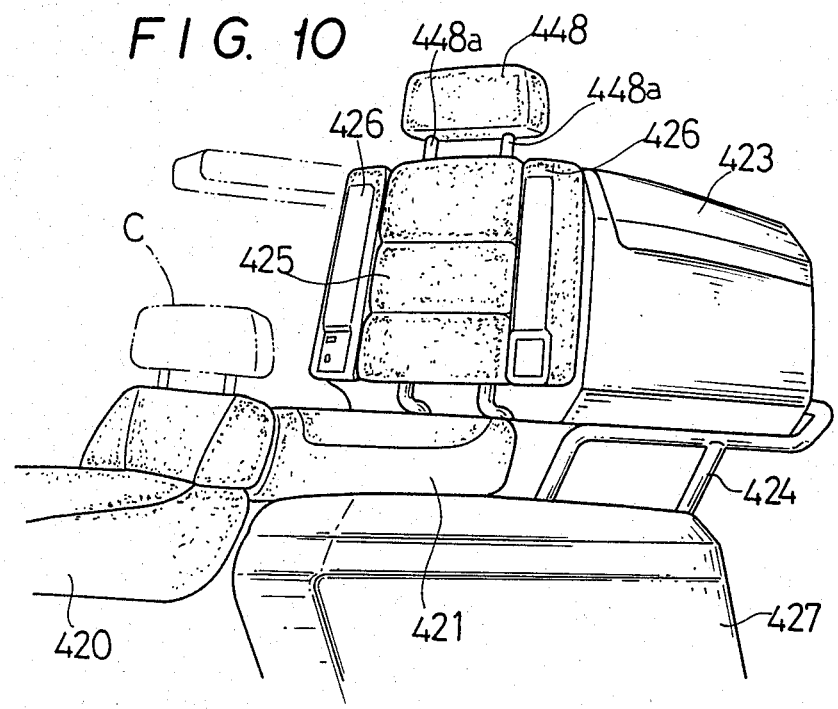
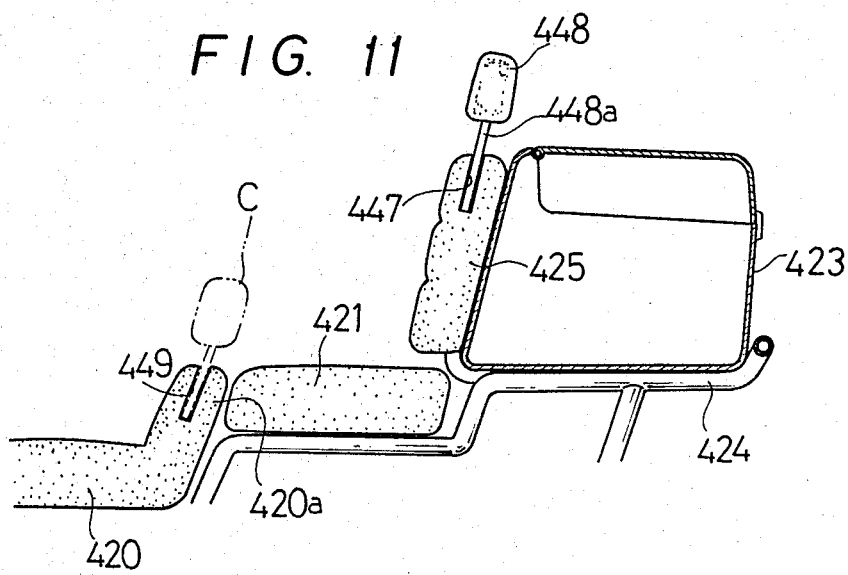

REAR SEAT DEVICE FOR TWO-WHEELED MOTOR VEHICLES

BACKGROUND OF THE INVENTION

1. Field of the Invention

The present invention relates to a rear seat device for two-wheeled motor vehicles and more particularly to a rear seat device for two-wheeled motor vehicles including a back rest portion and an arm rest.

2. Description of Relevant Art

Conventional rear seats in two-wheeled motor vehicles of an ordinary type, no matter whether they are integral with or separate from the front seat, have been unsatisfactory, and incapable of assuring the comfort of the rear passenger, because the rear passenger must use hands to hold on to the body of the front passenger in order to keep his body on the rear seat.

The present invention has been accomplished for overcoming the above-mentioned problems.

SUMMARY OF THE INVENTION

According to the present invention, there is provided a rear seat device for a two-wheeled motor vehicle having front and rear seats mounted on a frame, the rear seat device comprising a back rest portion supported by the frame behind the rear seat and arm rest means attached to at least one of right and left sides of the back rest portion.

Accordingly, it is the object of the present invention to provide a rear seat device for a two-wheeled motor vehicle whereby the rear passenger can ride the vehicle while resting his elbow on the arm rest thereby permitting enhancement of the passenger's comfort especially during long-distance touring.

The above and other features, objects and advantage of the present invention will become more apparent from the following description when taken in conjunction with the accompanying drawings in which preferred embodiments of the present invention are shown by way of illustrative examples.

BRIEF DESCRIPTION OF THE DRAWINGS

FIG. 10 is a perspective view of a rear seat device according to a fourth embodiment of the present invention;

FIG. 11 is a sectional side view of the rear seat device of FIG. 10;

DETAILED DESCRIPTION OF PREFERRED EMBODIMENTS

Figure 1:
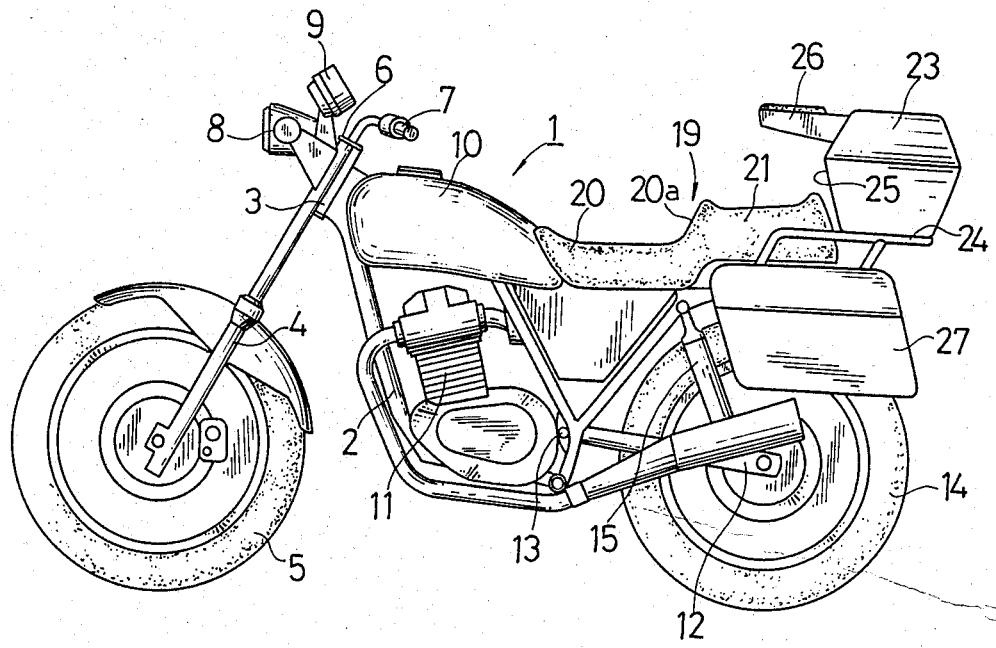
FIG. 1 is a side view of a two-wheeled motor vehicle equipped with a rear seat device according to a first embodiment of the present invention.

Referring first to FIG. 1, a front fork 4 which supports a front wheel 5 is secured steerably to a head tube 3 at the fore end of a frame 2 of a two-wheeled motor vehicle 1. On a top bridge 6 of the front fork 4 is mounted a handle 7. In front of the handle 7 is mounted a headlight unit 8, above which is mounted a meter unit 9. A fuel tank 10 is mounted on an upper front portion of the frame 2, and an engine 11 is mounted on a lower front portion thereof. Extending backward from a lower rear portion of the frame 2 is a rear fork 12, which is swingable by being pivoted to the frame at its front end 13 and which supports a rear wheel 14 at its rear end, with a rear cushion unit 15 being interposed between the rear portion of the rear fork 12 and the frame 2.

Behind the fuel tank 10 of the two-wheeled motor vehicle is mounted a seat 19, which comprises a front seat portion 20 for a front passenger and a rear seat portion 21 for a rear passenger. The rear seat portion 21 is in a position higher than the front seat portion 20. An upwardly extending, rearwardly inclined waist rest portion 20a is formed at the rear end of the front seat portion, with the rear seat portion 21 extending backward from the upper portion of the waist rest portion 20a.

Behind the rear seat portion 21 is supported a center bag 23 serving as a goods container on the frame 2 through a support stay 24 having a conventional structure. The front face of the center bag 23 forms a back rest portion 25. The arm rests 26 extending forward are provided on the right and left sides of the upper portion of the front face of the center bag 23 so that they are positioned on the right and left sides of a rear passenger who sits on the rear seat portion. The arm rests 26 can be folded by being moved through a rotating or swinging motion for the convenience of the rear passenger when getting on and off the motor vehicle.

According to the above-described arrangement, the rear passenger sits on the rear seat portion while his back is supported by the back rest portion 25 and his elbows are placed on the arm rests 26, whereby a relaxed posture of riding can be obtained. This permits enhancement of comfort, particularly, during a touring drive. Also shown in FIG. 1, side bags 27 can be disposed on both lower sides of the center bag 23.

A second embodiment of the present invention will be described below with reference to FIG. 2.

Figure 2:
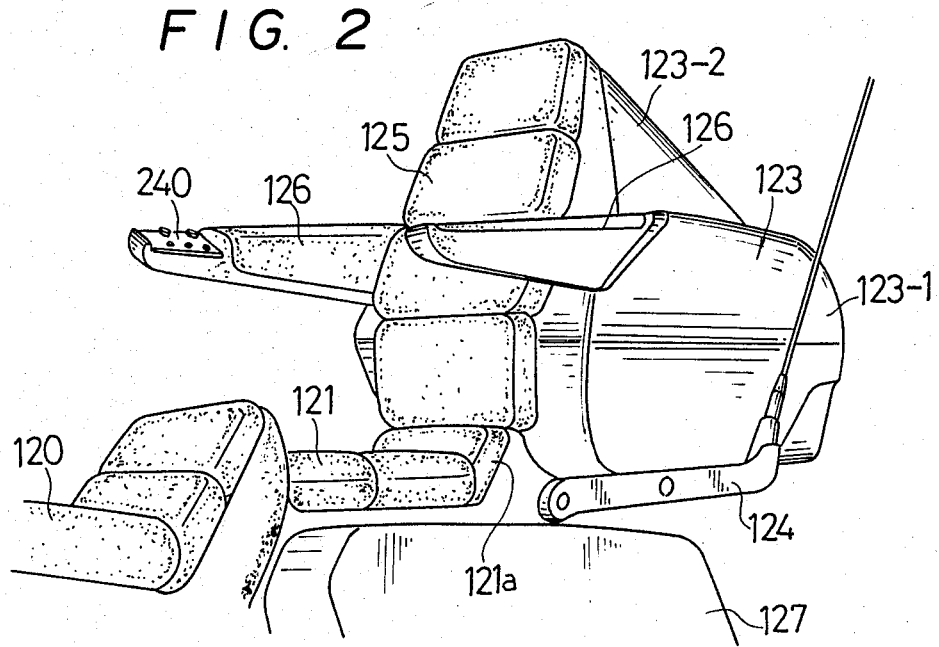
FIG. 2 is a perspective view of a rear seat device according to a second embodiment of the present invention.

FIG. 2 is a perspective view of the second embodiment, in which are shown a front seat 120 and rear seat 121. Behind the rear seat 121 is disposed a center bag 123 which is supported by a stay 124. A back rest 125 with cushion is mounted on the front face of the center bag 123. The back rest 125 has substantially the same width as the rear seat 121 and is contiguous to and above a waist rest portion 121a formed at the rear end of the rear seat. The back rest is narrower than the lateral dimension of the center bag.

Figure 3:
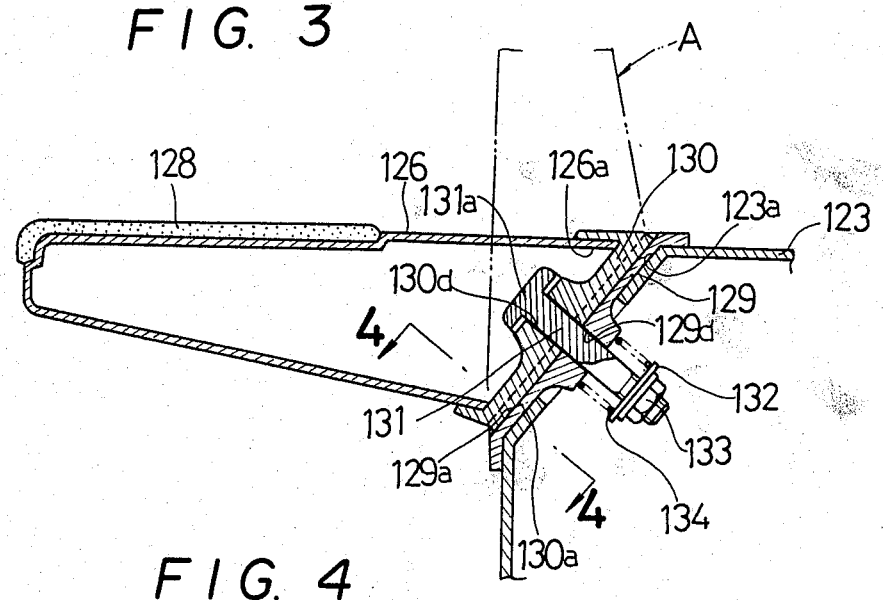
FIG. 3 is a sectional side view of an arm rest and its supporting portion in the first and second embodiment of the invention.
Figure 4:
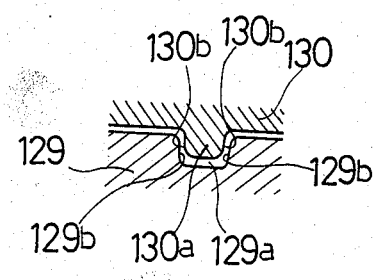
FIG. 4 is a sectional view taken on line 4—4 of FIG. 3.
Figure 14:
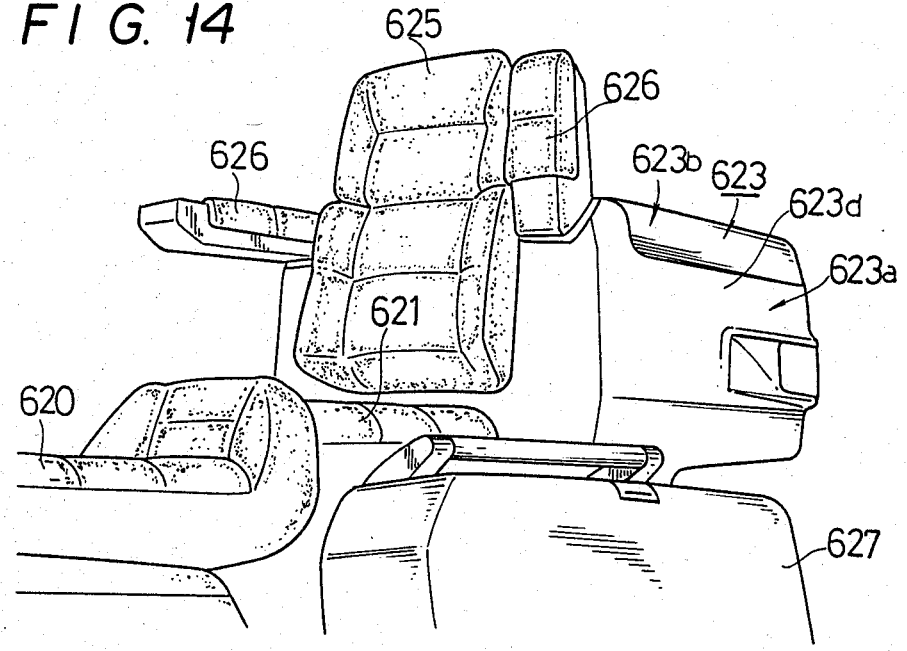
FIG. 14 is a perspective view of a rear seat device according to a sixth embodiment of the present invention.

Two arm rests 126 are mounted so that they extend forward from the right and left sides of the front portion of the center bag 123. A mounting portion of the arm rest 126 is shown as a sectional side view in FIG. 3. The arm rest 126 comprises a hollow body with a cushioning material 128 attached to the upper surface and the passenger side of the arm rest from intermediate to foreend thereof. A support portion 123a formed at each of the front portions of both sides of the center bag 123 includes an upwardly rearwards inclined plane of an angle of approximately 45-deg. A receiving seat 129 which has a flat surface is attached to the outer surface of the inclined plane. A support member 130 having a flat surface is attached to a base portion 126a of the arm rest 126. The receiving seat 129 and the support member 130 are in abutment with each other through the respective flat surfaces thereby permitting the arm rest 126 to retain a horizontally extending posture when used. In the receiving seat 129 and the support member 130 are centrally formed mounting holes 129d and 130d, respectively, through which is inserted a support shaft 131, whereby the arm rest 126 is pivotably connected to the receiving seat 129 about the support shaft 131. The arm rest 126 is raised or lowered by virture of a guiding action of both flat surfaces of the receiving seat 129 and the support member 130. A head portion 131a of the support shaft 131 engages the surrounding portion of the hole 130d of the support member 130, and a spring shoe 132 is mounted on the base end portion of the support shaft 131 by means of a nut 133. A spring 134 is disposed in a compressed state between the spring shoe 132 and the back of the receiving seat 129, whereby the support member 130 and the receiving seat 129 are held in a resilient abutment with each other. As clearly shown in FIG. 4, an engaging recess 129a is formed in the surface of the receiving seat 129, while a projection 130a adapted to engage the recess 129a is formed on the surface of the support member 130. By engagement of a side 130b of the projection 130a with an inner side wall 129b opposed thereto of the recess 129a, the arm rest 126 is prevented from pivoting and is locked in that position. The arm rest 126 is in turn unlocked by being lifted and then moved pivotally, so that it rises upright to the folded position as shown in chain line A in FIG. 3 and is locked again and held in this state. In this manner, the arm rests are removed from both sides of the rear passenger, thereby permitting the rear passengeer to get on and off the motor vehicle easily. Also, in the folded position the arm rest cushion material adds to the width of the back rest as shown in FIG. 14.

Figure 5:
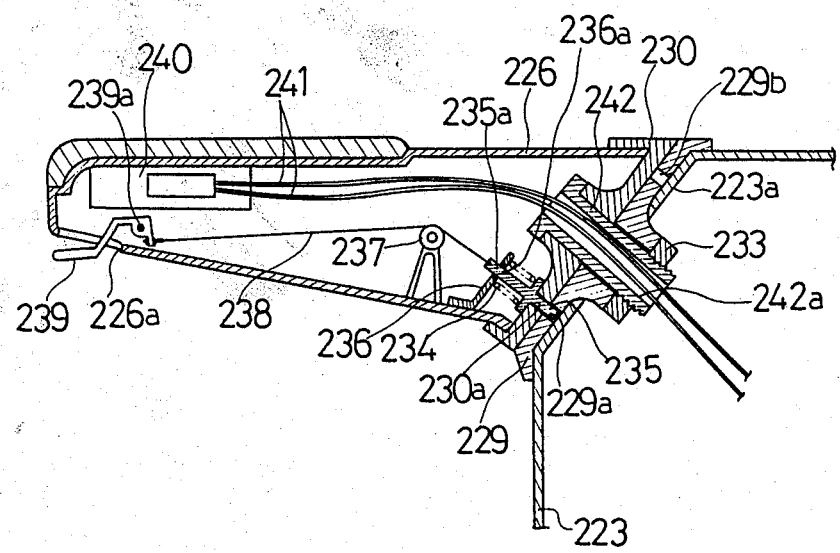
FIG. 5 is a sectional side view of a modified example of an arm rest and its supporting portion in the first and second embodiments of the invention.

Referring now to FIG. 5, there is shown a modified example of the arm rest and its supporting portion in the first and second embodiments of the present invention. A first engaging hole 229a and a second engaging hole 229b are formed in the lower and upper portions, respectively, of a receiving seat 229 which is attached to a mounting portion 223a of the the center bag. A guide hole 230a is formed in a support member 230 attached to an arm rest 226, and a stopper pin 235 held in a resiliently biased state by a spring 234 is inserted through the guide hole 230a. The pin 235 has a rear portion 235a which is inserted through a guide hole 236a of a guide stay 236 mounted within the arm rest 236, and its rear end is connected to one end of a control cable 238 which is guided by a guide roller 237. The other end of the control cable 238 is connected to one end of a control lever 239 projecting from an opening 226a formed in the lower side of the front portion of the arm rest 226, the lever 239 being pivotably provided in the interior of the front portion of the arm rest 226. FIG. 5 shows the arm rest in use, in which the pin 235 is in engagement with the first engaging hole 229a so as to maintain the illustrated state of the arm rest.

By lifting the level 239 by grasping it or by any other suitable way, the cable 238 is pulled, so that the pin 235 is moved against the force of the spring 234 and disengaged from the first engaging hole 229a to allow the arm rest 226 to move pivotably. The arm rest 226 is moved to be in the upright state and locked in this state by releasing the lever 239 to engage the pin 235 with the second engaging hole 229b.

The arm rest 126, 226 can be provided with a control panel 240 as clearly shown in FIG. 2. A microphone and a speaker are provided in the helmet of the passenger for an intercommunication and radio device of a known type which permits the passengers to talk to each other, and is controlled through the control panel 240. Wiring 241 at the back of the panel 240 is conducted through the interior of the arm rest 126, 226 into the center bag 123, 223. As shown in FIG. 5, a support shaft 242 for attaching the arm rest to the center bag comprises a tubular shaft having an axially extending through hole 242a, through which is inserted the wiring 241, whereby the damage of the wiring and the entry of water into the center, which might occur when running in the rain, can both be prevented. In the modification of FIG. 5, the arm rest is attached to the center bag with only a nut 233 without using a spring.

Figure 6:
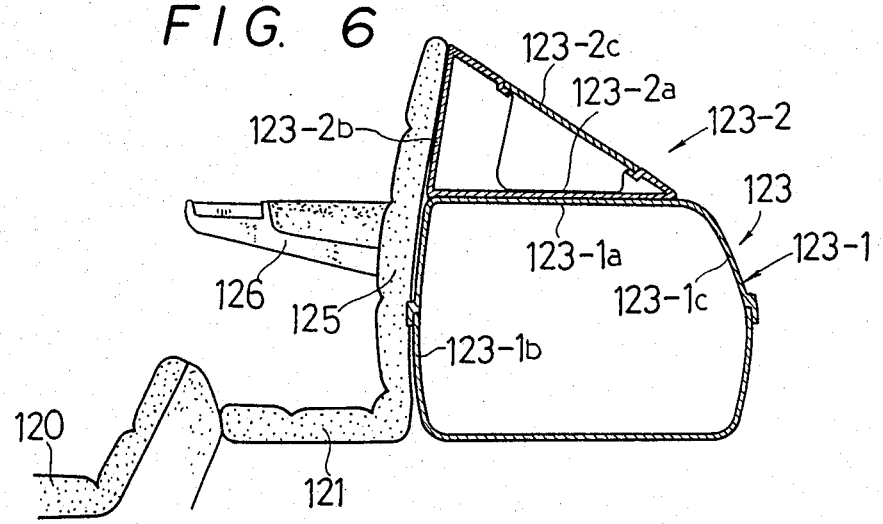
FIG. 6 is a sectional side view of the rear seat device of FIG. 2.

In the foregoing second embodiment, as shown in FIG. 6, the center bag 123 comprises a main bag 123-1 and a sub bag 123-2 which overlies the main bag. More particularly, on an upper wall 123-1a of the main bag 123-1 is placed and fixed a bottom wall 123-2a of the sub bag 123-2. The sub bag 123-2 has a substantially triangular side shape. A front wall 123-2b thereof defining one side of the triangle supports the upper portion of the back rest 125, while a front wall 123-1b of the main bag 123-1 supports intermediate and lower portions of the back rest 125. The main bag 13-1 has a lid member 123c-1 which is removed when the bag 123-1 is opened. Alternatively, a lid member capable of opening and closing the main bag 123-1 may be provided at a side portion of the main bag. As to the sub bag 123-2, a part of its upper wall is formed as a lid member 123-2c, and the sub bag is opened by removing this lid member. According to such arrangement, the space behind the back rest can be utilized as a goods container, and particularly by forming its upper portion as a small articles container, the function as a goods container can be enhanced. In the drawings, the reference numeral 127 denotes a side bag.

Figure 7:
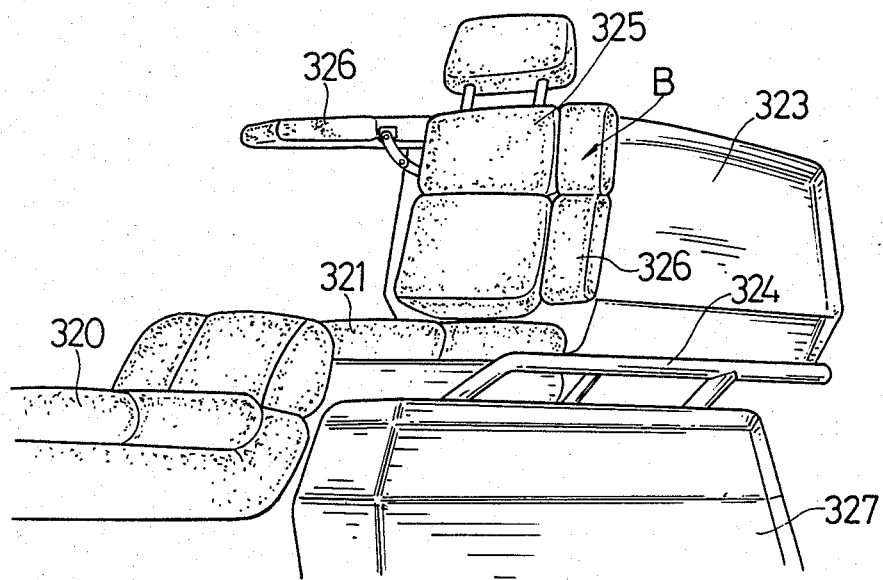
FIG. 7 is a perspective view of a rear seat device according to a third embodiment of the present invention.
Figure 8:
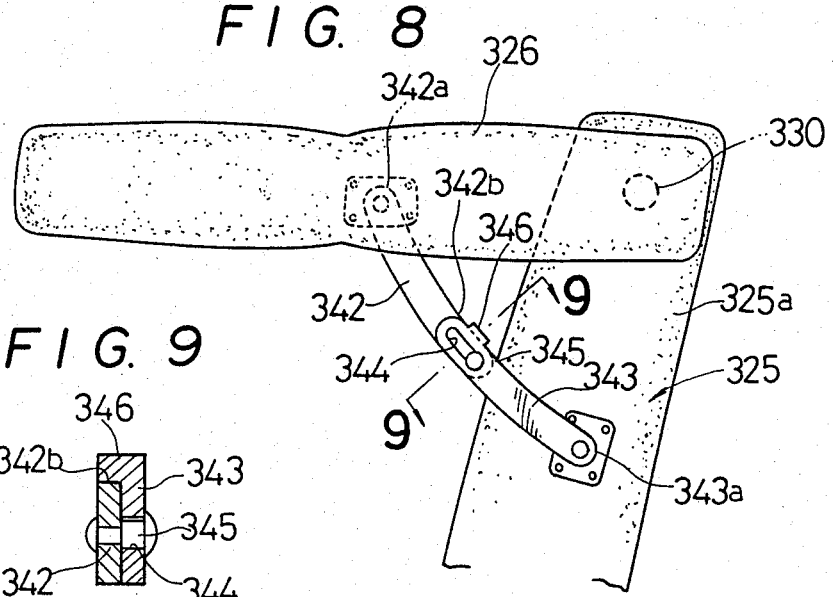
FIG. 8 is an enlarged side view of an arm rest supporting structure in the rear seat device of FIG. 7.
Figure 9:
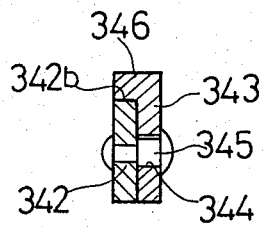
FIG. 9 is a sectional view taken on line 9—9 of FIG. 8.

Referring now to FIGS. 7 and 8, there is illustrated a third embodiment of the present invention, in which a front seat 320, a rear seat 321 for a rear passenger, a back rest 325, a center bag 323 and its support stay 324, and a side bag 327 are similar in their arrangement to those in the other embodiments described above.

As clearly shown in FIG. 8, right and left arm rests 326 are pivoted at the respective upper end portions to the right and left upper end portions of the back rest 325 each through a shaft 330, and are overlapped parallely with both side portions 325a of the back rest 325 and are held in a generally perpendicular, downward state. A first arcuate arm 342 is pivoted at its one end 342a to an inner side of an intermediate portion of each arm rest 326, while a second arcuate arm 343 is pivoted at its one end 343a to a side portion 325a of the back rest 325. The second arm 343 is provided at the other end thereof with a longitudinally elongated hole 344, while the first arm 342 is provided at the other end thereof with a pin 345. The elongated hole 344 and the pin 345 are in slideable engagement with each other. The second end 343 is further provided in the vicinity of the elongated hole 344 with a retaining portion 346 which engages an upper side portion 342b of the first arm 342. In the state that the arm rest 326 is in use, the pin 345 contacts the lower end of the elongated hole 344 and the lower surface of the retaining portion 346 contacts the upper side portion 342b of the first arm as shown in FIG. 8, whereby such a relatively rotational movement of the first and second arms as to lower the connecting point of both arms is prevented, and the arm rest 326 is kept in this position even when a downward load is imposed thereon.

To move away the arm rest, the first and second arms are rotatably moved so that their connecting point moves upward, and then the arm rest 326 is rotated downward about the pivot shaft 330, to be set side by side with a side portion of the back rest as indicated at B in FIG. 7.

Referring now to FIGS. 10 and 11, there is illustrated a fourth embodiment of the present invention, in which a front seat 420, a rear seat 421 for a rear passenger, a center bag 423 and its support stay 424, and a side bag 427 are similar in their arrangement to those in the other embodiments described above.

In front of the center bag 423 is mounted a back rest 425, and on both sides of the back rest 425 are mounted arm rests 426 for rising and falling motion; that is each arm rest 426 is raised horizontally when used and is set down when not used.

In the top of the back rest 425 is formed a supporting recess 447 which is open upwards as shown in FIG. 11. Arm portions 448a of a head rest 448 are inserted in the supporting recess 447, whereby the head rest 448 is mounted removably above the back rest for the rear passenger. Also in a waist rest portion 420a of the front seat 420 is formed a supporting recess 449 which is open upwards, and when there is no rear passenger on the front seat, the head rest can be used as a back rest for the front passenger by removing it from the supporting recess 447 of the back rest 425 and inserting it into the recess 449 as clearly shown in chain line C. Although the recesses 447 and 449 are typically shown diagrammatically in the figure, they are actually formed of a hard synthetic resin or metal, and there may be provided a known mechanism for adjusting the height of the head rest 448.

Figure 12:
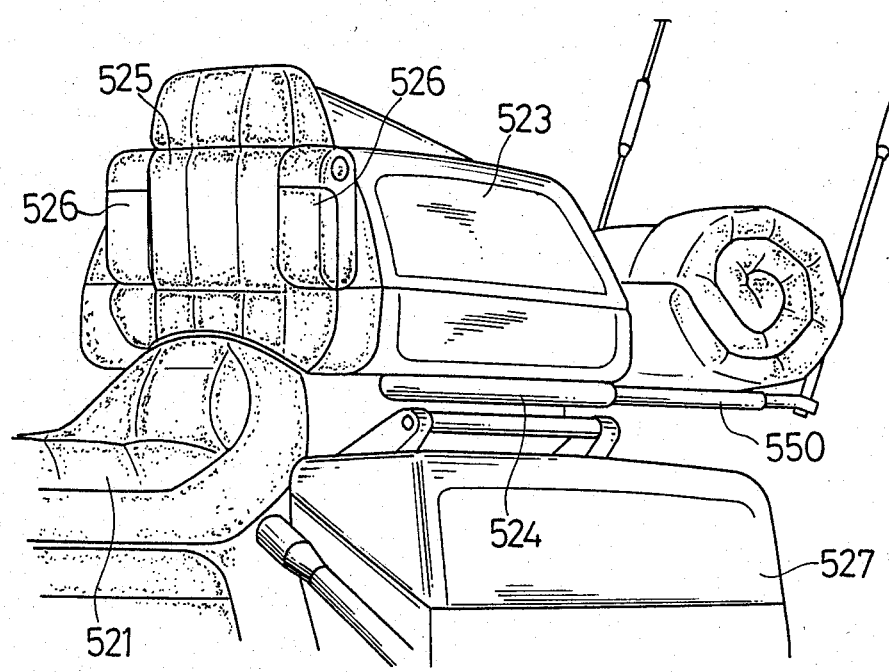
FIG. 12 is a perspective view of a rear seat device according to a fifth embodiment of the present invention.
Figure 13:
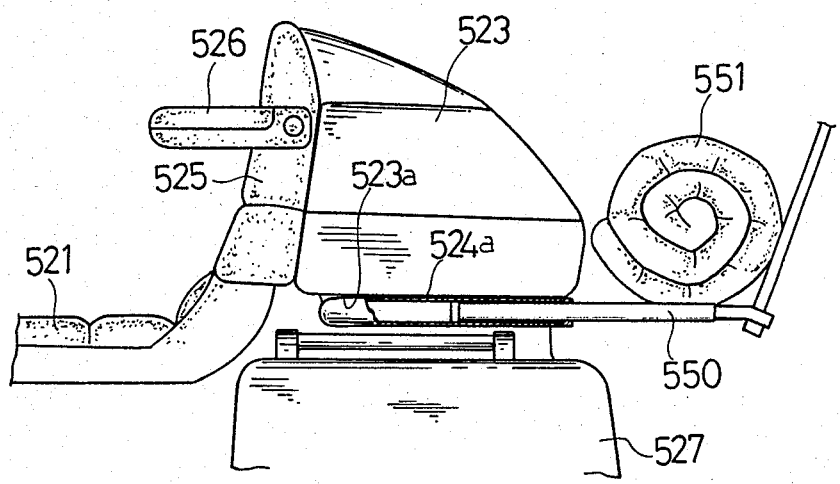
FIG. 13 is a partially sectional side view of the device of FIG. 12.

Referring now to FIGS. 12 and 13, there is illustrated a fifth embodiment of the present invention, in which a rear seat 521 for a rear passenger, a center bag 523 and its support stay 524, a back rest 525, an arm rest 526 and a side bag 527 are similar in their arrangement to those in the other embodiments described above.

The support stay 524 includes a pair of pipes 524a extending in the longitudinal direction of the two-wheeled motor vehicle body so as to support the right and left portions of a lower surface 523a of the center bag 523. The pipes 524a are open rearwards, into which openings are slideably inserted sub stays 550 which are each formed in the shape of a rod. The sub stays 550, when not in use, are accommodated within the stay 524, and for use, they are drawn out rearwards therefrom as shown in the figure and used as a carrier for carrying, for example, a sleeping bag 551 for camping.

Figure 15:
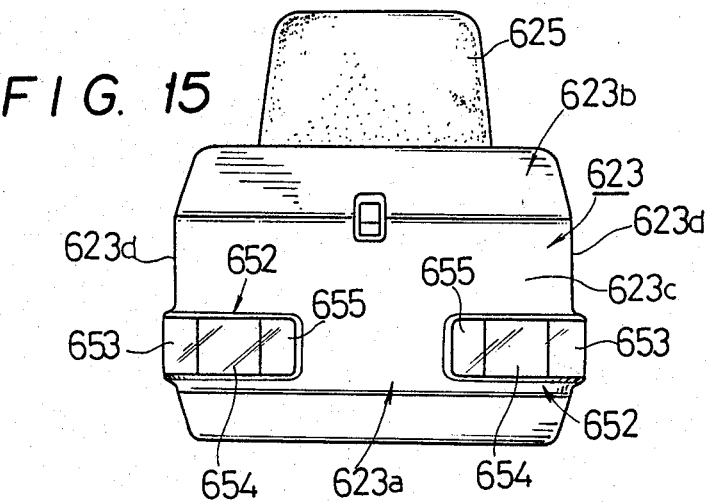
FIG. 15 is a rear view of the rear seat device of FIG. 14.

Referring now to FIGS. 14 and 15, there is illustrated a sixth embodiment of the present invention, in which a front seat 620, a rear seat 621 for a rear passenger, a center bag 623, a back rest 625, an arm rest 626 and a side bag 627 are similar in their arrangement to those in the other embodiments described above.

In this embodiment, the center bag 623, which has a fairly large width, comprises a body 623a and a closure member 623b capable of being opened upwards. On both side portions of a back 623c of the body 623a and on rear portions of both outer sides 623d thereof are mounted right and left tail light units 652. Each tail light unit includes an outermost blinker lamp 653 serving also as a clearance lamp, a stop lamp 654 and an innermost back lamp 655. By mounting the tail light units 652 on the back of such a wide center bag, the mounting stay for those lamps can be eliminated and their visibility can be much improved. The combination of those lamps and the order of their arrangement from the inside to the outside or vice versa may be changed optionally.

Figure 16:
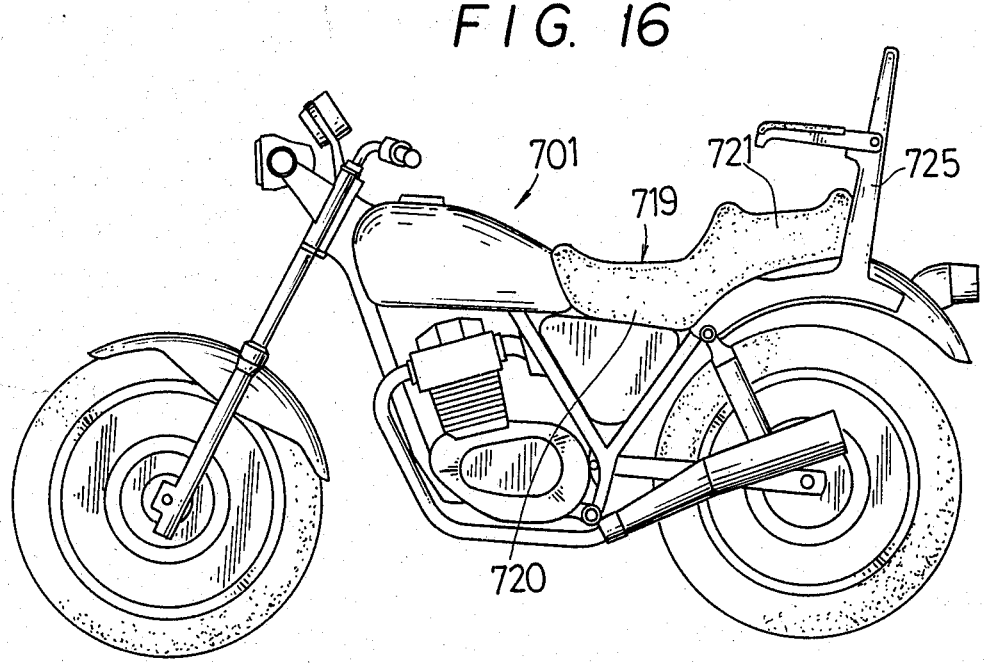
FIG. 16 is a side view of a two-wheeled motor vehicle equipped with a rear seat device according to a seventh embodiment of the present invention.
Figure 17:
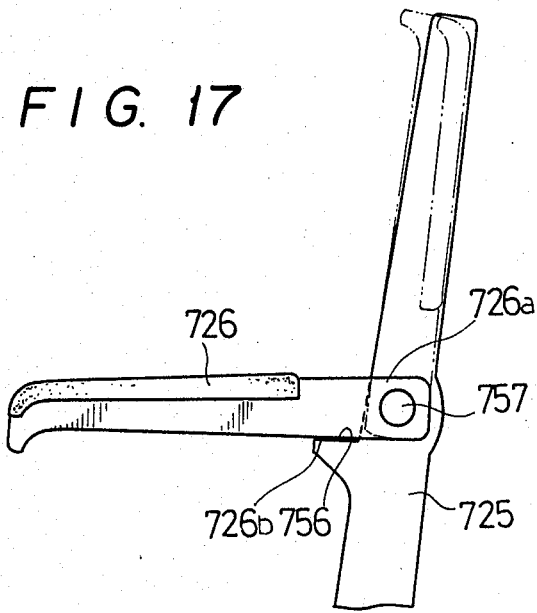
FIG. 17 is an enlarged side view of an upper part of a back rest portion and an arm rest in the rear seat device shown in FIG. 16.

Referring now to FIGS. 16 and 17, there is illustrated a seventh embodiment of the present invention, in which a seat 719 having a front seat portion 720 and a rear seat portion 721 for a rear passenger is mounted on a two-wheeled motor vehicle 701. A back rest 725 is secured at its front and is thereby supported. The back rest 725 is provided on its front face with forwardly projecting stepped stopper portions 756, and on both sides thereof are provided arm rests 726 capable of rising and falling. The arm rests 726 are each pivoted at its base end portion 726a to a side portion of the back rest 725 with a shaft 757 in a position slightly above the stepped portion 756. When used, the arm rest 726 is in a lowered state and a lower edge 726b of the base portion of the arm rest is in contact with the upper surface of the stepped portion 756, whereby the arm rest is prevented from swinging downward. When the rear passenger gets on or off the motor vehicle, the arm rest is moved away to be raised upward. The arm rest of such a structure may be applied to the back rest which is mounted in front of the center bag.

According to the present invention, as will be appreciated from the above description, there can be attained various advantages in a two-wheeled motor vehicle having a seat for a rear passenger, for example, the rear passenger can ride the motor vehicle in a relaxed posture and the riding comfort can be enhanced; in addition, an effective utilization of the center bag and the formation of a carrier can be attained, thus permitting enhancement of utility of two-wheeled motor vehicles of this type.

Although there have been described what are at present considered to be preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

What is claimed is:

1. A rear seat device, for a two-wheeled motor vehicle having a front seat and a rear seat both mounted on a frame, comprising:
    a back rest supported by said frame in a position behind said rear seat; and
    arm rest means positioned at least one of right and left sides of said back rest and arranged to be movable between a substantially horizontal posture when in use and a substantially upright folded posture, said arm rest means comprising a support portion folded from said frame including a receiving seat having a planar surface extending upwardly to the rear at an angle of approximately 45°, an arm rest including a support member attached to a base portion thereof and having a flat surface abutting said receiving seat, mounting holes formed centrally in said receiving seat and said support member, and a support shaft inserted through said mounting holes and including means to hold said support member in resilient abutment with said receiving seat, said support shaft extending upwardly toward the front of said vehicle, whereby said arm rest is pivotally movable about said support shaft between said horizontal posture and said folded posture.

2. A rear seat device according to claim 1, wherein said back rest comprises a part of a carrier bag, said carrier bag being fixed to said frame through a support stay.

3. A rear seat device according to claim 2, wherein said support stay comprises a pipe member extending in a longitudinal direction with respect to the body of said two-wheeled motor vehicle, and a sub stay slideably inserted in said pipe member.

4. A rear unit device according to claim 2, wherein said carrier bag is provided at the back thereof with tail light units.

5. A rear seat device as recited in claim 1, wherein said arm rest means further includes means for locking said arm rest in both said postures.

6. A rear seat device according to claim 5, wherein said back rest comprises a part of a carrier bag, said carrier bag being fixed to said frame through a support stay.

7. A rear seat device according to claim 6, wherein said support stay comprises a pipe member extending in a longitudinal direction with respect to the body of said two-wheeled motor vehicle, and a sub stay slideably inserted in said pipe member.

8. A rear unit device according to claim 6, wherein said carrier bag is provided at the back thereof with tail light units.

9. A rear seat device according to claim 8, wherein said support stay comprises a pipe member extending in a longitudinal direction with respect to the body of said two-wheeled motor vehicle, and a sub stay slideably inserted in said pipe member.

10. A rear seat device, for a two-wheeled motor vehicle having a front seat and a rear seat both mounted on a frame, comprising:
    a carrier bag fixed to said frame;
    a back rest comprising a part of said carrier bag, the width of said back rest being substantially equal to the width of said rear seat and substantially less than the lateral dimension of said carrier bag; and
    foldable arm rest means on at least one of right and left sides of said back rest and including an arm rest having a cushion on at least one surface thereof, said arm rest having a substantially horizontal posture with said cushion facing upward when in use and having a substantially upright posture at a side of said back rest with said cushion facing forward when folded, whereby said folded arm rest provides additional back rest area.

11. A rear seat device according to claim 10, wherein said back rest comprises a part of a carrier bag, said carrier bag being fixed to said frame through a support stay.

12. A rear seat device as claimed in claim 10, wherein said arm rest means further includes means for locking said arm rest in position.

13. A rear seat device according to claim 12, wherein said arm rest means further includes a shaft member and means for locking said arm rest, said shaft member extending in a transverse direction with respect to a body of said two-wheeled motor vehicle, and wherein said arm rest is connected to said back rest portion swingably through said shaft member and adapted to be moved swingably between a horizontal posture thereof when in use and a substantially upright posture thereof when folded, and adapted to be locked by said locking means while it is in said horizontal posture.

14. A rear seat device according to claim 13, wherein said back rest comprises a part of a carrier bag, said carrier bag being fixed to said frame through a support stay.

15. A rear seat device according to claim 14, wherein said support stay comprises a pipe member extending in a longitudinal direction with respect to the body of said two-wheeled motor vehicle, and a sub stay slideably inserted in said pipe member.

16. A rear unit device according to claim 14, wherein said carrier bag is provided at the back thereof with tail light units.

17. A rear seat device according to claim 1 or claim 12, characterized by further including a head rest and two head rest supporting structures for supporting said head rest, one of said head rest supporting structures being provided at the top of said back rest portion and the other is provided between said front and rear seats, and said head rest being attached removably to either one of said supporting structures.

* * * * *